(12) United States Patent
Reid (10) Patent No.: US 11,261,700 B2
(45) Date of Patent: Mar. 1, 2022

(54) DOWNHOLE FLUID CONTROL APPARATUS

(71) Applicant: Weatherford U.K. Limited, Leicestershire (GB)

(72) Inventor: Stephen Reid, Loughborough (GB)

(73) Assignee: Weatherford U.K. Limited, Leicestershire (GB)

( * ) Notice: Subject to any disclaimer, the term of this patent is extended or adjusted under 35 U.S.C. 154(b) by 84 days.

(21) Appl. No.: 16/621,055

(22) PCT Filed: May 17, 2018

(86) PCT No.: PCT/GB2018/051339
§ 371 (c)(1),
(2) Date: Dec. 10, 2019

(87) PCT Pub. No.: WO2019/008310
PCT Pub. Date: Jan. 10, 2019

(65) Prior Publication Data
US 2020/0199971 A1    Jun. 25, 2020

(30) Foreign Application Priority Data

Jul. 3, 2017  (GB) ..................................... 1710654

(51) Int. Cl.
*E21B 34/10* (2006.01)
*E21B 34/14* (2006.01)

(52) U.S. Cl.
CPC .............. *E21B 34/10* (2013.01); *E21B 34/14* (2013.01); *E21B 2200/04* (2020.05)

(58) Field of Classification Search
CPC ...... E21B 34/10; E21B 34/14; E21B 2200/04; F16K 17/18
See application file for complete search history.

(56) References Cited

U.S. PATENT DOCUMENTS 3,942,550 A * 3/1976 Orme ..................... F16K 17/18
137/493
6,427,778 B1    8/2002 Beall et al.
(Continued)

FOREIGN PATENT DOCUMENTS

GB          2515624 A       12/2014
WO      2015/179100 A1    11/2015

OTHER PUBLICATIONS

Combined Search and Examination Report in corresponding UK Appl. GB1710654.3, dated Nov. 28, 2017, 5-pgs.
(Continued)

*Primary Examiner* — Dany E Akakpo
(74) *Attorney, Agent, or Firm* — Blank Rome LLP (57) ABSTRACT

A downhole fluid control apparatus comprises first and second conduits for providing communication between a pressure source and a downhole device, and a valve provided within a housing and configurable between a first configuration in which the first and second conduits are in pressure communication via the valve, and a second configuration in which the first and second conduits are isolated from each other. The apparatus further comprises an actuator for operating the valve. The actuator is in pressure communication with the first and second conduits and with an ambient region external of the apparatus such that when the pressure within each of the first and second conduits is lower than the ambient pressure the valve is configured in its first configuration, and when the pressure within at least one of the first and second conduits exceeds the ambient pressure the valve is configured in its second configuration.

21 Claims, 4 Drawing Sheets

(56) References Cited

U.S. PATENT DOCUMENTS

| | | |
|---|---|---|
| 7,552,773 B2 | 6/2009 | Wright et al. |
| 2001/0037884 A1 | 11/2001 | Schultz et al. |
| 2005/0247189 A1* | 11/2005 | Hazzard .............. F16H 61/4017 92/12.2 |
| 2009/0218102 A1 | 9/2009 | Casciaro |

OTHER PUBLICATIONS

In't Search Report and Written Opinion in PCT Appl. PCT/GB2018/051339, dated Jul. 17, 2018, 10-pgs.

* cited by examiner

DOWNHOLE FLUID CONTROL APPARATUS

FIELD

The present disclosure relates to a downhole fluid control apparatus, for example for use in a downhole hydraulic control system.

BACKGROUND

In the oil and gas industry the actuation or operation of downhole equipment, such as valves, sleeves, tools and the like may be achieved in many different ways, such as hydraulically, pneumatically, electrically, mechanically etc. In hydraulic systems hydraulic power may be provided from surface, or other location remote from the downhole equipment, via one or more hydraulic control lines. Such control lines may extend externally of a tubing string, such as a completion or production tubing string, and thus located within a wellbore annulus and exposed to ambient wellbore pressure.

As with any hydraulic system there is always a risk of leakage, either from the system into the environment, or, where pressure conditions dictate, from the environment into the hydraulic system. In circumstances where the ambient (for example annulus) pressure exceeds that within the control lines, for example where the ambient fluid has a higher density, in the event of a leak the control line may become pressurized. Such pressurization may cause undesired actuation of the associated downhole equipment.

SUMMARY

An aspect of the present disclosure relates to a downhole fluid control apparatus, comprising: first and second conduits for providing communication between a pressure source and a downhole device; a valve provided within a housing and configurable between a first configuration in which the first and second conduits are in pressure communication via the valve, and a second configuration in which the first and second conduits are isolated from each other; and an actuator for operating the valve, the actuator being in pressure communication with the first and second conduits and with an ambient region external of the apparatus such that when the pressure within each of the first and second conduits is lower than the ambient pressure the valve is configured in its first configuration, and when the pressure within at least one of the first and second conduits exceeds the ambient pressure the valve is configured in its second configuration.

The downhole device may be operable or operated by a pressure differential applied between the first and second conduits. In such an arrangement, when the valve is configured in its first configuration, such that the first and second conduits are in pressure communication, the ability to establish a pressure differential between the first and second conduits may be minimized or prevented. As such, operation of the downhole device may not be permitted when the valve is in its first configuration. The downhole device may only be permitted to be operated when the valve is configured in its second configuration.

In one example a first pressure differential applied between the first and second conduits may facilitate a first operation of the downhole device, and a second pressure differential applied between the first and second fluid conduits may facilitate a second operation of the downhole device.

When the valve member is in its first configuration the first and second conduits are in pressure communication with each other, and thus pressure balanced. The first configuration may thus also be defined as a balanced configuration. Any leakage of ambient fluid/pressure into one of the first and second conduits will not be permitted to develop a pressure differential between said conduits, which may otherwise cause an unintentional operation of the downhole device.

Furthermore, as the actuator is also in pressure communication with the ambient region, any leakage of ambient fluid/pressure into one of the first and second conduits will not cause the actuator to operate, as said actuator will also be pressure balanced, avoiding or minimizing risk of the actuator reconfiguring the valve from its first position.

Accordingly, in the event of any exposure (for example via a leak) to ambient pressure when the valve is in its first configuration the actuator and conduits may be considered to be pressure balanced. This may permit the apparatus to function in a "fail-as-is" mode of operation.

Whenever operation of the downhole device is required, the pressure in at least one of the first and second conduits is elevated above the ambient pressure, allowing the actuator to reconfigure the valve to its second configuration. In this way pressure communication provided via the valve may be removed, allowing a pressure differential to be established between the first and second conduits and thus operate the downhole device.

In some examples the valve may be reconfigured from its first configuration to its second configuration by elevating the pressure in both the first and second conduits above the ambient pressure. In such an arrangement a subsequent pressure differential may be achieved by further elevating the pressure in one of the first and second fluid conduits. A pressure differential may be achieved by reducing the pressure in one of the first and second fluid conduits. A pressure differential may be achieved by retaining pressure in one of the first and second conduits while venting or relieving pressure in the other of the first and second conduits.

In some examples the first and second pressure differentials may be provided in opposing directions. For example, the first pressure differential may comprise providing a higher pressure in one of the first and second conduits, and the second pressure differential may comprise providing a higher pressure in the other of the first and second conduits.

In some examples the first and second pressure differentials may be provided in a common direction, and provided by different magnitudes of pressure differential.

The downhole fluid control apparatus may be locatable within a wellbore, such that the ambient region external to the apparatus may comprise a wellbore region. In some examples the ambient region may comprise a wellbore annulus region. The ambient region may contain a wellbore fluid, such as a completion fluid, produced fluid, gas or the like. The ambient pressure may comprise hydrostatic pressure. The ambient pressure may comprise formation pressure. The ambient pressure may be controlled and/or affected from a remote location, for example from a surface location.

The actuator may be in fluid communication with the ambient region to permit pressure communication therebetween. In some examples where fluid communication is provided the apparatus may comprise a filter within a fluid communication path, to minimize risk of contamination of the actuator from material carried in the fluid within the ambient region. Alternatively, the actuator may be in pressure communication with the ambient region via a pressure transfer arrangement, for example via a piston arrangement, diaphragm or the like, thus providing pressure communication without also requiring fluid communication. This may minimize risk of the actuator being contaminated, for example with debris and the like within the ambient region.

In one example the first and second conduits may be in fluid communication when the valve is in its first configuration to permit said conduits to be presented in pressure communication. Alternatively, the first and second conduits may be in pressure communication via a pressure transfer arrangement when the valve is in its first configuration.

The first and/or second conduits may be in fluid communication with the actuator to permit pressure communication therebetween. The first and/or second conduits may be in pressure communication with the actuator via a pressure transfer arrangement.

The first and second conduits may form part of respective first and second control lines which extend between the pressure source and the downhole device. In some examples the first and second conduits may form an integral part of respective first and second control lines. Alternatively the first and second conduits may be separately provided and coupled in-line with respective first and second control lines. In this respect the first and second conduits may include opposing end connectors, such as threaded connectors or the like.

The first and second conduits may be provided within or through the housing of the apparatus. In one example the first and second fluid conduits may be provided by bores, for example drilled bores, through the housing.

The first and second fluid conduits may be in communication with the valve via one or more respective communication paths, such as bores, tubes, channels or the like.

The valve may comprise a valve member moveable between a first position in which the valve is configured in its first configuration, and a second position in which the valve is configured in its second configuration. When the valve member is in its first position a communication path may be established between the first and second conduits. When the valve member is in its second position any fluid communication path may be sealed to prevent communication between the first and second conduits.

In some examples the valve member may be axially moveable between its first and second positions.

The housing may define a valve bore, and the valve member may be moveable, for example axially moveable, within the valve bore. The valve bore may define a first valve port in communication with the first conduit and a second valve port in communication with the second conduit. The valve member may be moveable within the valve bore to selectively permit and prevent communication between the first and second valve ports.

The valve may comprise or define a spool valve.

The housing may define an actuator bore, wherein the actuator is moveable, for example axially moveable, within the actuator bore. The actuator bore may be separately provided from the valve bore. However, in some examples the actuator bore and valve bore may be provided as a common bore extending within, for example through, the housing. The valve and actuator may be separated by a sealing arrangement, such as an annular sealing arrangement. The sealing arrangement may permit the actuator and valve to be inter-engaged.

The actuator bore may comprise one or more ambient ports to facilitate or permit the actuator to be in communication with the ambient region.

The actuator bore may define a first actuator port in communication with the first conduit and a second actuator port in communication with the second conduit. The first and second actuator ports may permit the actuator to be in communication with the first and second conduits.

The actuator may function to move, for example axially move, the valve member. In some examples the actuator may be coupled to the valve member. The actuator may comprise the valve member.

The actuator may be moveable in a first direction to cause the valve to be reconfigured from its first configuration to its second configuration. The actuator may be moveable in a second direction to cause the valve to be reconfigured from its second configuration to its first configuration. The second direction may be opposite to the first direction.

Pressure within the first and/or second conduit may act on the actuator to bias said actuator in the first direction. Ambient pressure may resist movement of the actuator in the first direction. This arrangement may permit the actuator to be moved in the first direction when the pressure within the first and/or second conduit exceeds ambient pressure.

The actuator may be configured such that ambient pressure may resist movement of the actuator in its first direction, but said ambient pressure prevented from causing movement of the actuator in its second direction. Accordingly, ambient pressure may be prevented from operating/moving the actuator rod.

The actuator may be biased in the second direction by a biasing arrangement, such as a spring or the like.

The actuator may comprise an actuator piston assembly operable by pressure provided via one or both of the first and second conduits.

The actuator piston assembly may comprise an actuator rod. The actuator rod may be moveable, for example axially moveable within the housing, for example within the actuator bore. The actuator rod may be secured to the valve, for example to the valve member of the valve. The actuator rod may comprise a unitary component. The actuator rod may comprise multiple components secured or arranged together.

In some examples ambient pressure may be communicated to the actuator via the actuator rod, for example via one or more internal bores within the actuator rod.

The actuator assembly may comprise a first piston head moveably mounted in a first piston bore section within the housing. The first position bore section may be formed or provided by the actuator bore. The first piston head may be generally annular in form. The first piston head may divide the first piston bore section into a first conduit chamber and a first ambient chamber. The first conduit chamber may be in pressure (for example fluid) communication with the first conduit, and the first ambient chamber may be in pressure (for example fluid) communication with the ambient region. Accordingly, the first piston head may move in the first piston bore section in accordance with a pressure differential across said first piston head between the first conduit and ambient chambers.

The first piston head may be mounted around the actuator rod, for example circumscribing the actuator rod. The first piston head may be coupled to the actuator rod such that movement of the first piston head may cause movement of the actuator rod, and thus the valve. In one example the first piston head may be coupled to the actuator rod via a unidirectional connection. The unidirectional connection may permit the first piston head to drive the actuator rod in the first direction, and prevent the first piston head from driving the actuator rod in the second direction. The unidirectional connection may permit the first piston head to be coupled with the actuator rod during movement of the first piston head in the first direction, but decoupled during movement of the first piston head in the second direction. The unidirectional connection may comprise an upset portion (e.g., a no-go profile) on the actuator rod, wherein the first piston head engages the upset portion when moved in the first direction, and disengaged from the upset portion when moved in the second direction.

The actuator assembly may comprise a second piston head moveably mounted in a second piston bore section within the housing. The second position bore section may be formed or provided by the actuator bore. The second piston bore section may be isolated from the first bore section by a sealing arrangement. The first and second piston heads may be arranged in a series configuration.

The second piston head may be generally annular in form. The second piston head may divide the second piston bore section into a second conduit chamber and a second ambient chamber. The second conduit chamber may be in pressure (for example fluid) communication with the second conduit, and the second ambient chamber may be in pressure (for example fluid) communication with the ambient region. Accordingly, the second piston head may move in the second piston bore section in accordance with a pressure differential across said second piston head between the second conduit and ambient chambers.

The second piston head may be mounted around the actuator rod, for example circumscribing the actuator rod. The first and second piston heads may be axially spaced apart along the actuator rod. The second piston head may be coupled to the actuator rod such that movement of the second piston head may cause movement of the actuator rod, and thus the valve. In one example the second piston head may be coupled to the actuator rod via a unidirectional connection. The unidirectional connection may permit the second piston head to drive the actuator rod in the first direction, and prevent the second piston head from driving the actuator rod in the second direction. The unidirectional connection may permit the second piston head to be coupled with the actuator rod during movement of the second piston head in the first direction, but decoupled during movement of the second piston head in the second direction. The unidirectional connection may comprise an upset portion (e.g., a no-go profile) on the actuator rod, wherein the second piston head engages the upset portion when moved in the first direction, and disengaged from the upset portion when moved in the second direction.

The downhole fluid control apparatus may comprise a downhole hydraulic control apparatus.

The downhole device may comprise any downhole device. For example, the downhole device may comprise a valve, such as a ball valve. The downhole device may comprise a sliding sleeve device.

The first operation of the downhole device may comprise an opening operation, for example a valve opening operation of the downhole device. The second operation of the downhole device may comprise a closing operation, for example a valve closing operation of the downhole device.

An aspect of the present disclosure relates to a method for downhole fluid control, comprising: providing communication between a pressure source and a downhole device via first and second conduits; providing an actuator in pressure communication with the first and second conduits and with an ambient region external of the apparatus, wherein the actuator operates a valve; establishing a pressure within each of the first and second conduits which is lower than the ambient pressure such that the valve is configured in a first configuration in which the first and second fluid conduits are in pressure communication with each other; and establishing a pressure within at least one of the first and second conduits which exceeds the ambient pressure to cause the actuator to reconfigure the valve to a second configuration in which the first and second conduits are isolated from each other.

The method may comprise establishing a pressure within each of the first and second conduits which exceeds the ambient pressure to cause the actuator to reconfigure the valve to a second configuration in which the first and second conduits are isolated from each other.

The method may comprise establishing a pressure differential between the first and second conduits when the valve is configured in its second configuration to operate the downhole device. In one example the method may comprise, when the valve is in its second configuration, establishing a first pressure differential between the first and second conduits to facilitate a first operation of the downhole device. The method may comprise, when the valve is in its second configuration, establishing a second pressure differential between the first and second conduits to facilitate a second operation of the downhole device.

The method may be performed with the fluid control apparatus of any other aspect.

In some examples the downhole fluid control apparatus may be capable of use in other applications which are not restricted to a downhole environment. For example, the apparatus may be used in other applications where there is potential for leakage to/from a fluid system that may cause unintentional operation of devices or equipment.

As such, an aspect of the present disclosure relates to a fluid control apparatus comprising: first and second conduits for providing communication between a pressure source and a device; a valve provided within a housing and configurable between a first configuration in which the first and second conduits are in pressure communication via the valve, and a second configuration in which the first and second conduits are isolated from each other; and an actuator for operating the valve, the actuator being in pressure communication with the first and second conduits and with an ambient region external of the apparatus such that when the pressure within each of the first and second conduits is lower than the ambient pressure the valve is configured in its first configuration, and when the pressure within at least one of the first and second conduits exceeds the ambient pressure the valve is configured in its second configuration.

An aspect of the present disclosure relates to a method for fluid control, comprising: providing communication between a pressure source and a device via first and second conduits; providing an actuator in pressure communication with the first and second conduits and with an ambient region external of the apparatus, wherein the actuator operates a valve; establishing a pressure within each of the first and second conduits which is lower than the ambient pressure such that the valve is configured in a first configuration in which the first and second fluid conduits are in pressure communication with each other; and establishing a pressure within at least one of the first and second conduits which exceeds the ambient pressure to cause the actuator to reconfigure the valve to a second configuration in which the first and second conduits are isolated from each other.

Features defined in relation to one aspect may be applied to any other aspect.

BRIEF DESCRIPTION OF THE DRAWINGS

These and other aspects of the present disclosure will now be described, by way of example only, with reference to the accompanying drawings, in which.

DETAILED DESCRIPTION OF THE DRAWINGS

Aspects of the present disclosure relate to apparatus and methods for providing fluid control in a wellbore. Such aspects may provide advantages in terms of preventing or minimizing the risk of wellbore pressure, which may leak into the associated hydraulic system, from causing unintentional operation of one or more downhole devices.

Figure 1:
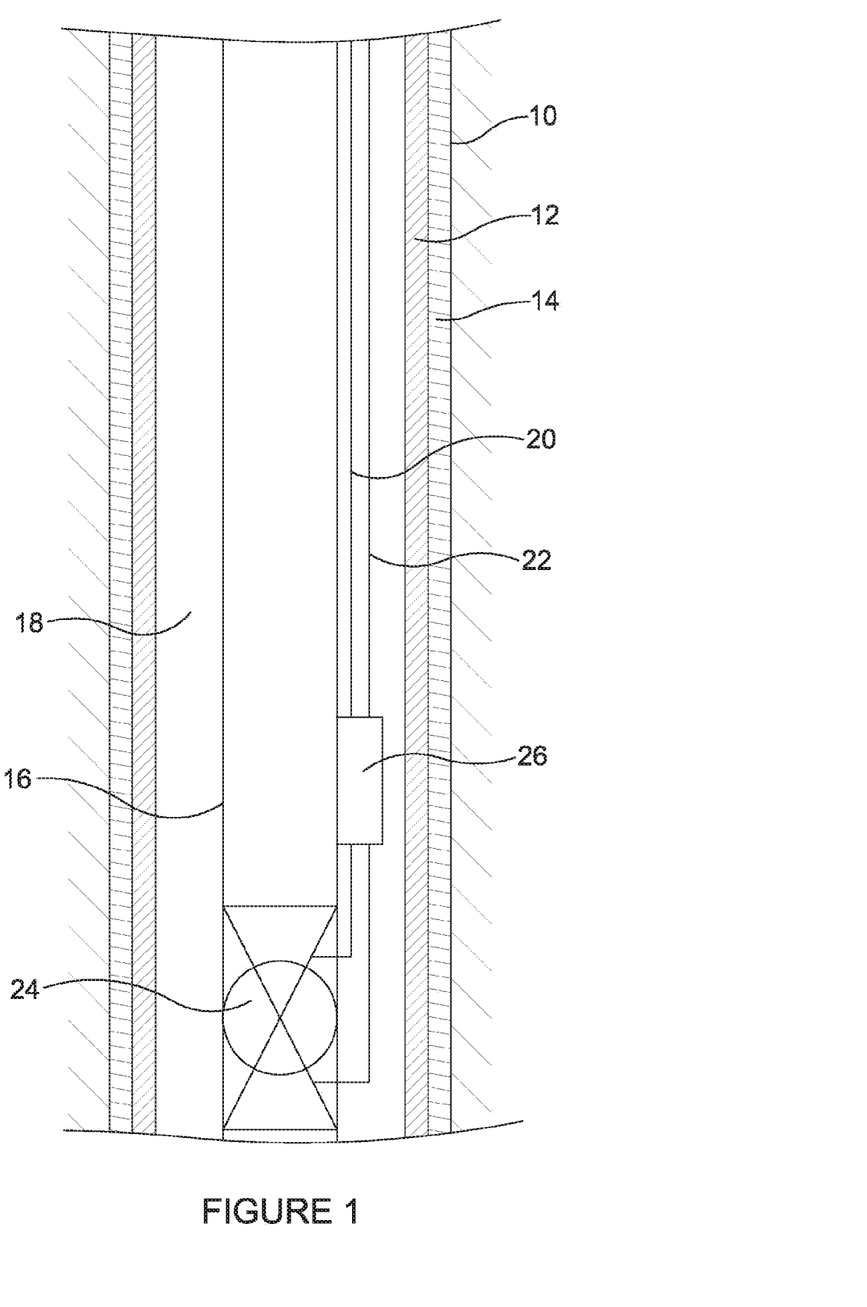
FIG. 1 is a diagrammatic illustration of a downhole fluid control apparatus in use within a wellbore.

FIG. 1 diagrammatically illustrates a drilled wellbore 10 with a casing string 12 cemented therein via a cement sheath 14. The wellbore 10 is illustrated as a vertical bore section, although could be a deviated and/or horizontal bore section. Furthermore, the wellbore 10 may alternatively be an open hole wellbore (i.e., absent any casing string).

A tubular string 16, such as a completion string, extends within the wellbore 10, with an annulus 18 defined between the tubular string 16 and the casing string 12. First and second control lines 20, 22 extend along an outer surface of the tubular string 16, and thus in the annulus 18, and provide a fluid communication path between a surface located pressure source (not shown) and a downhole device 24, which in the present example is a ball valve, although any downhole device may be provided. In the present example a first pressure differential established between the first and second control lines 20, 22 provides a first operation of the ball valve 24, for example an opening operation of the ball valve 24. A second pressure differential established between the first and second control lines 20, 22 provides a second operation of the ball valve 24, for example a closing operation of the ball valve 24. In the present example the first pressure differential may comprise the pressure in the first control line 20 exceeding the pressure in the second control line 22, and conversely the second pressure differential may comprise the pressure in the second control line 22 exceeding the pressure in the first control line 20. The first and second pressure differentials may be achieved via suitable pressure control at surface, for example.

As the ball valve 24 is operated by a pressure differential between the first and second control lines 20, 22, should one of the control lines 20, 22 become exposed to annulus pressure, for example due to a leak, there is a risk of the ball valve 24 being operated unintentionally. To minimize this risk, a fluid control apparatus 26 according to an aspect of the present disclosure is coupled in-line with the first and second control lines 20, 22.

Figure 2:
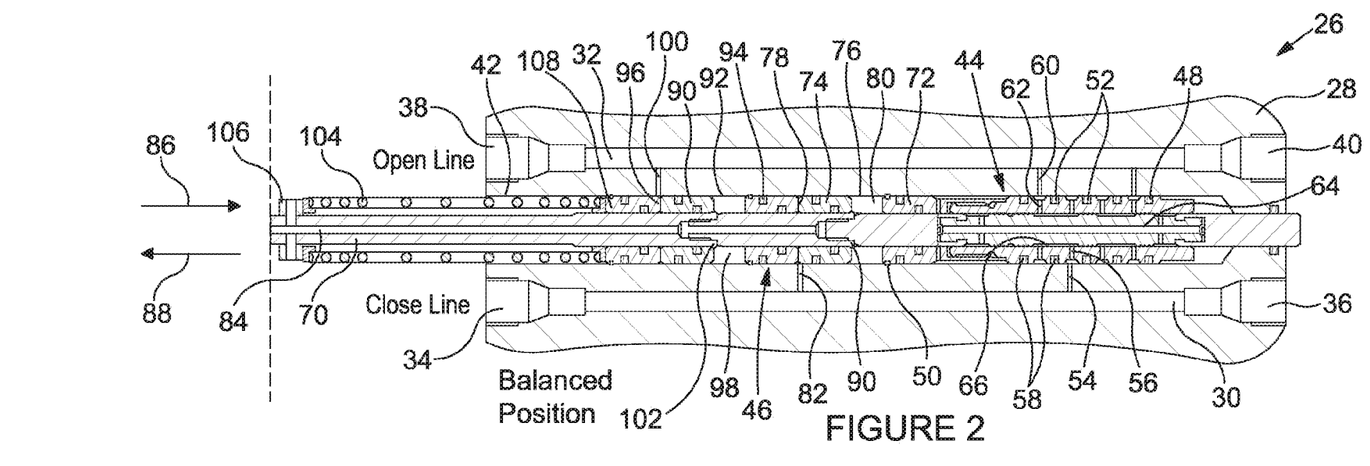
FIGS. 2 to 6 are diagrammatic illustrations of sequences in operating the fluid control apparatus of FIG. 1.

FIG. 2 provides a diagrammatic cross-sectional view of the fluid control apparatus 26, provided in an initial balanced configuration. In such a configuration any pressure differential between the first and second control lines 20, 22 may be prevented. This balanced configuration may be established during running of the tubular string 16, and up until operation of the valve 24 is required, at which stage the apparatus 26 may be reconfigured, which will be described in detail below.

The apparatus 26 includes a housing 28 with first and second conduits 30, 32 in the form of drilled bores extending through the housing 28. The first conduit 30 includes opposing threaded end connectors 34, 36 which facilitates inline connection with the first control line 20 (FIG. 1). Similarly, the second conduit 32 includes opposing threaded end connectors 38, 40 with facilitate inline connection with the second control line 22 (FIG. 1).

The apparatus 26 also comprises a primary bore 42 extending through the housing 28, aligned generally parallel with the bores forming the first and second conduits 30, 32. An assembly 44 is axially moveably mounted within the primary bore 42 and includes a valve 44 coupled with an actuator 46.

The valve 44 includes a valve seal insert 48 which is fixed relative to the housing 28 via a wire connection 50. The valve seal insert 48 includes a first pair of seals 52 (e.g., O-rings) which straddle a port 54 which is in fluid communication with the first conduit 30, wherein the valve seal insert 48 includes an aligned port 56 which provides a communication path to the inner diameter of said valve seal insert 48. The valve seal insert 48 includes a second pair of seals 58 (e.g., O-rings) which straddle a port 60 which is in fluid communication with the second conduit 32, wherein the valve seal insert 48 includes an aligned port 62 which provides a communication path to the inner diameter of said valve seal insert 48. It will be noted that first and second pairs of seals 52, 58 include a common seal member.

The valve 44 further includes a valve member or spool 64 which is axially moveable within the valve seal insert 48, wherein the valve spool 64 includes an annular recess 66 on an outer surface thereof.

The valve 44 is illustrated in a first configuration in FIG. 2, with the valve spool 64 located at a first position. When configured as shown in FIG. 2 the annular recess 66 of the valve spool 64 is positioned to provide communication between the ports 56, 62 in the valve seal insert 48, thus presenting the first and second conduits 30, 32 in communication with each other. In this respect, the first and second conduits 30, 32 are pressure balanced, such that a pressure differential therebetween is not permitted.

The actuator 46 comprises an actuator rod 70 formed from multiple parts threaded together (although in other examples a unitary rod may be provided), wherein one end of the actuator rod 70 is coupled with the valve spool 64, such that axial movement of the actuator rod 70 causes corresponding axial movement of the valve spool 64. The actuator rod 70 extends through an annular seal portion 72 of the valve seal insert 48, which seals against both the inner surface of the primary bore 42 and the actuator rod 70. The annular seal portion 72 thus functions to sealingly isolate the actuator 46 from the valve 44.

The actuator 46 further comprises a first piston head in the form of a first annular piston 74 axially moveable within a first piston bore section 76 and sealingly engaged with both the inner surface of the primary bore 42 and an outer surface of the actuator rod 70. The first annular piston 74 divides the first piston bore section 76 into a first conduit chamber 78 and a first ambient chamber 80. The first conduit chamber 78 is in communication with the first conduit 30 via a communication path 82, and the first ambient chamber 80 is in communication with an ambient region externally of the apparatus (specifically the annulus 18 shown in FIG. 1) via a bore 84 extending through the actuator rod 70 (alternatively a port may be provided through the housing 28). Threaded connections between adjacent components of the actuator rod 70 may provide a suitable communication path from the bore 84 to the first ambient chamber 80. Accordingly, the first annular piston 74 is moveable in accordance with a pressure differential between the first conduit 30 and the annulus 18. In the configuration of FIG. 2 the first annular piston 74 is positioned such that the first conduit chamber 78 is at its minimum volume and the first ambient chamber 80 is at its maximum volume.

The first annular piston 74 is engaged with the actuator rod 70 via a unidirectional connection which provides an axial connection between the first annular piston 74 and the actuator rod 70 when the first annular piston 74 is moved in a first direction illustrated by arrow 86, and prevents any axial connection when the first annular piston 74 is moved in a reverse second direction illustrated by arrow 88. In the present example the unidirectional connection includes an upset profile 90 provided on the actuator rod 70, wherein the first annular piston 74 engages the upset profile 90 when said piston 74 is moved in the first direction 86, and is permitted to disengage the upset profile 90 when the first annular piston 74 is moved in the second direction 88.

The unidirectional connection permits the first annular piston 74 to cause the actuator rod 70 to move and operate the valve 44 when the pressure in the first conduit 30 exceeds annulus pressure (moving the actuator rod in the first direction 86). However, when ambient pressure exceeds the pressure within the first conduit 30 the first annular piston may move in the second direction independently of the actuator rod 70.

The actuator 46 further comprises a second piston head in the form of a second annular piston 90 axially moveable within a second piston bore section 92 and sealingly engaged with both the inner surface of the primary bore 42 and an outer surface of the actuator rod 70. The first and second piston bore sections 76, 92 are separated by an annular sealing member 94 which is fixed relative to the housing 28.

The second annular piston 90 divides the second piston bore section 92 into a second conduit chamber 96 and a second ambient chamber 98. The second conduit chamber 96 is in communication with the second conduit 32 via a communication path 100, and the second ambient chamber 92 is in communication with an ambient region externally of the apparatus (specifically the annulus 18 shown in FIG. 1) via the bore 84 extending through the actuator rod 70 (alternatively a port may be provided through the housing 28). Threaded connections between adjacent components of the actuator rod 70 may provide a suitable communication path from the bore 84 to the second ambient chamber 92. Accordingly, the second annular piston 90 is moveable in accordance with a pressure differential between the second conduit 32 and the annulus 18. In the configuration of FIG. 2 the second annular piston 90 is positioned such that the second conduit chamber 96 is at its minimum volume and the second ambient chamber 92 is at its maximum volume.

In a similar manner to the first annular piston 74, the second annular piston 90 is engaged with the actuator rod 70 via a unidirectional connection, specifically an upset profile 102.

The actuator rod 70 is biased to move in the second direction 88 via a spring 104 which in the example shown in FIG. 2 acts between an end 106 of the actuator rod 70 and an annular sealing member 108 which is fixed to the housing 28. A spring may alternatively be provided at a different location within the apparatus 26.

When the apparatus 26 is in the configuration of FIG. 2, the first and second conduits 30, 32 are at a pressure which is lower than annulus pressure, such that the bias of the spring 104 positions the valve spool 64 in the illustrated first position, maintaining the first and second conduits 30, 32 in communication and pressure balanced. As such, operation of the ball valve 24 (FIG. 1) is not permitted.

Figure 3:
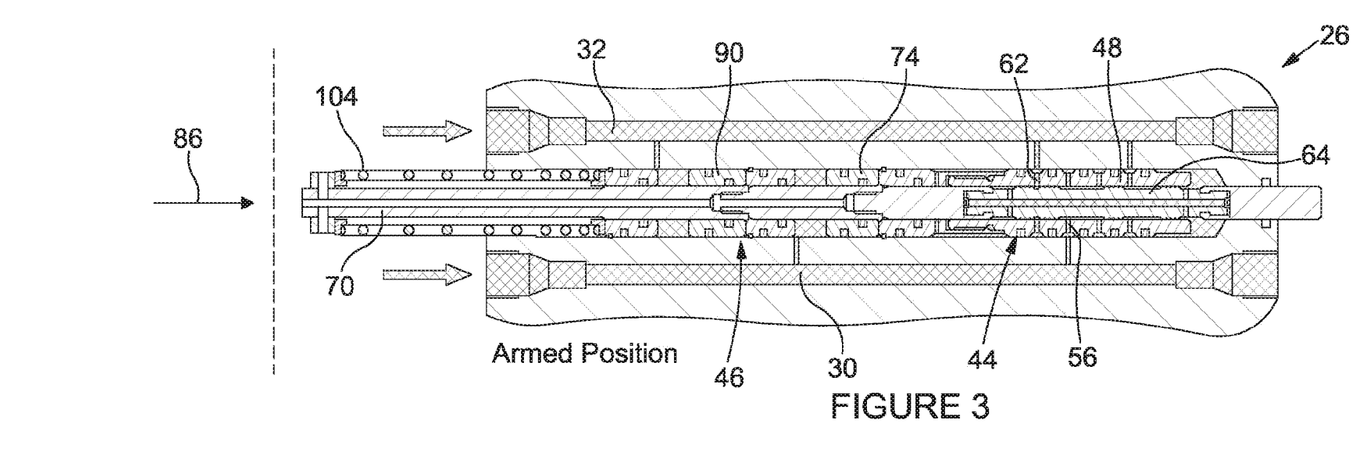

When operation of the ball valve 24 is required, the pressure in both the first and second conduits 30, 32 is elevated above annulus pressure, which, as illustrated in FIG. 3, causing the first and second annular pistons 74, 90 to be driven in the first direction 86, providing corresponding movement of the actuator rod 70 and connected valve spool 64, compressing spring 104. The valve spool 64 is thus moved to a second position to reconfigure the valve 44 into a second configuration in which the ports 56, 62 in the valve seal insert 48 are no longer in communication, isolating the first and second conduits 30, 32. When configured as shown in FIG. 3 the apparatus 26 may be considered to be arranged in an armed position.

Figure 4:
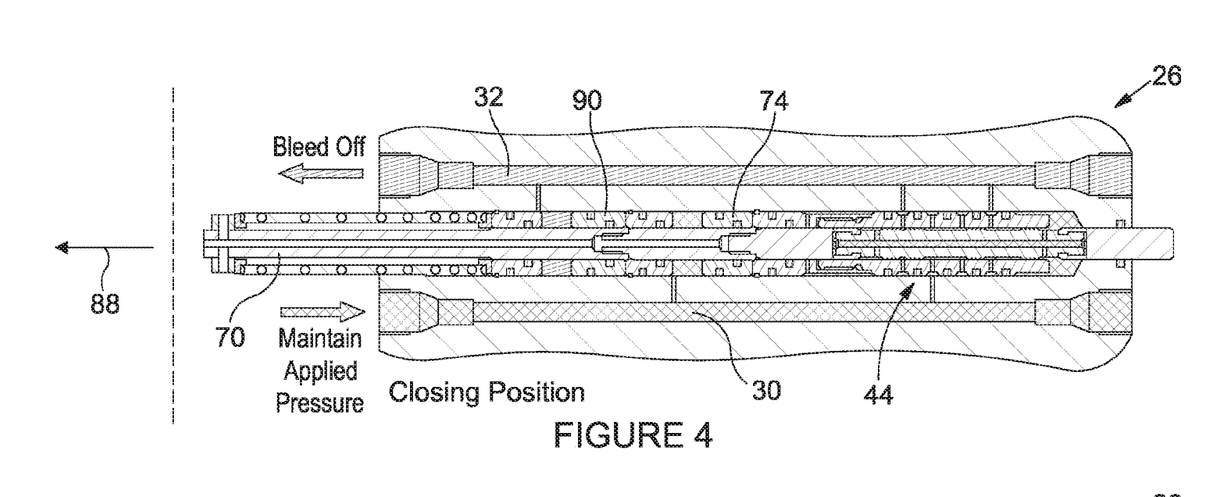

As the first and second conduits 30, 32 are no longer in communication a pressure differential therebetween may be provided to cause operation of the ball valve 24. For example, as illustrated in FIG. 4 the pressure within the first conduit 30 may be maintained, whereas the pressure within the second conduit 32 may be reduced, for example bled off or vented. This may provide a closing operation of the ball valve 24.

The maintained high pressure within the first conduit 30 holds the first annular piston 74 in position, maintaining the valve 44 in its second configuration and the isolation between the first and second conduits 30, 32. The second annular piston 90 may no longer be exposed to sufficient pressure via the second conduit 32 such that annulus pressure may be permitted to cause the second annular piston 90 to move in the second direction 88. However, such movement of the second annular piston 90 should not apply any return force on the actuator rod 70 by virtue of the unidirectional connection therebetween.

Figure 5:
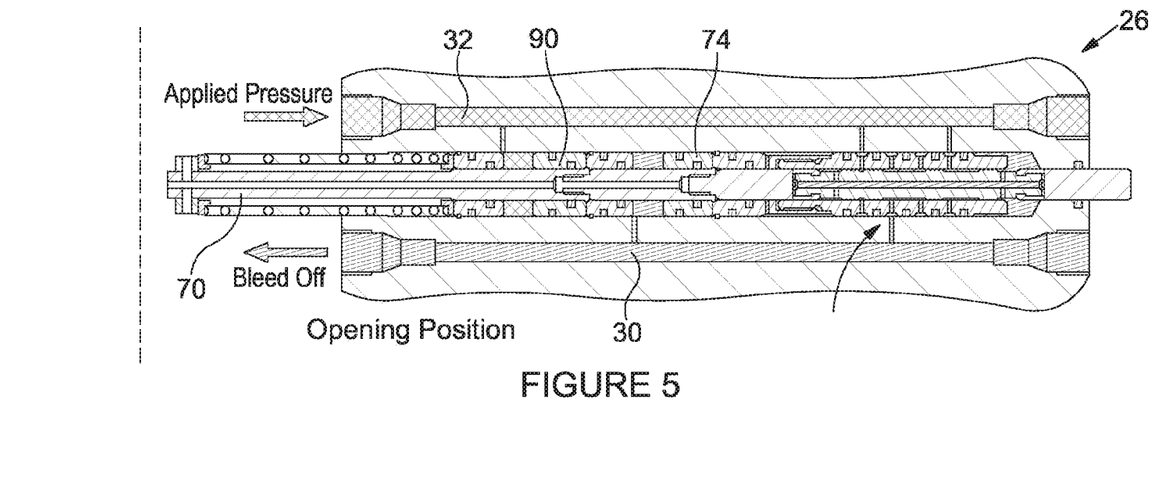

Whenever required, a reverse or second pressure differential between the first and second conduits 30, 32 may be established to provide a second operation of the ball valve 24, for example an opening operation. Such a reverse or second pressure differential applied is illustrated in FIG. 5, in which a high pressure is applied in the second conduit 32, with the pressure in the first conduit 30 reduced, for example vented or bled off. In some examples the high pressure condition of both the first and second conduits 30, 32, as illustrated in FIG. 3, may be established prior to switching between different operational pressure differentials.

Figure 6:
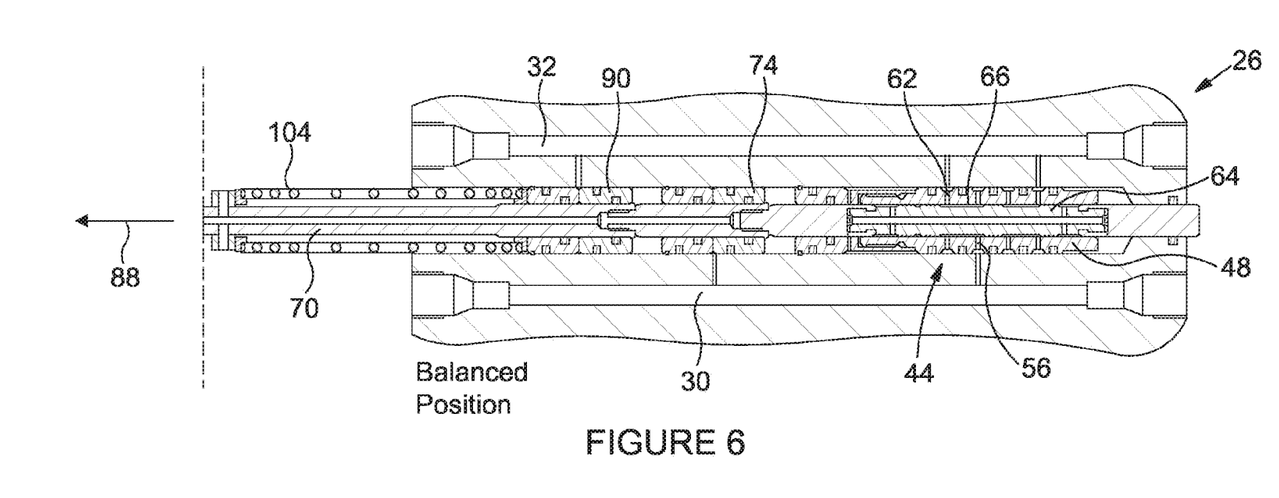

Once necessary operations have been performed, and/or between performing different operations, the pressure in both the first and second conduits 30, 32 may be reduced below annulus pressure, permitting the spring 104 to move the actuator rod 70 in the second direction, returning the valve spool 64 to its first position and thus the valve 44 to its first configuration, as illustrated in FIG. 6. As such, the first and second conduits 30, 32 may once again be provided in communication via the ports 56, 62 in the valve seal insert 48 and the annular recess 66 in the valve spool 64.

Figure 7:
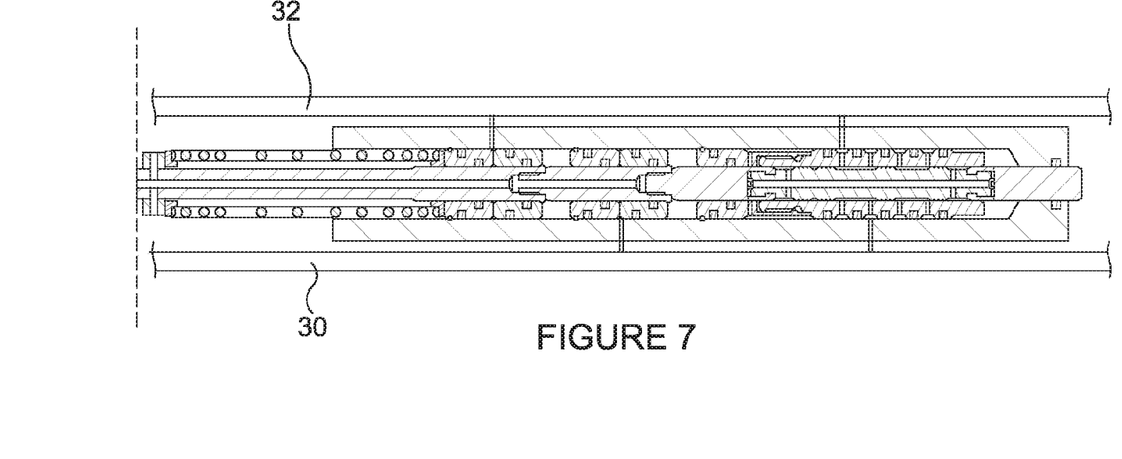
FIG. 7 is a diagrammatic illustration of a modified example of a fluid control apparatus.

In the example described above the first and second conduits 30, 32 are provided within a common housing. However, in other examples, such as illustrated in FIG. 7, the first and second conduits 30, 32 may be provided separately from the housing.

It should be understood that the examples provided herein are merely exemplary of the present disclosure, and that various modifications may be made thereto. For example, the control apparatus may be used in other applications, and may not be restricted for exclusive use in a wellbore.

The invention claimed is:

1. A downhole fluid control apparatus, comprising:
   first and second conduits for providing communication between a pressure source and a downhole device;

a valve provided within a housing and configurable between a first configuration in which the first and second conduits are in pressure communication via the valve, and a second configuration in which the first and second conduits are isolated from each other; and an actuator for operating the valve, the actuator being in pressure communication with the first and second conduits and with an ambient region external of the apparatus such that when the pressure within each of the first and second conduits is lower than the ambient pressure the valve is configured in its first configuration, and when the pressure within at least one of the first and second conduits exceeds the ambient pressure the valve is configured in its second configuration, wherein the actuator comprises an actuator piston assembly operable by pressure provided via one or both of the first and second conduits, the actuator piston assembly comprising an actuator rod moveable within the housing, wherein the actuator rod is engaged with the valve, and a first piston head moveably mounted in a first piston bore section within the housing, the first piston head dividing the first piston bore section into a first conduit chamber and a first ambient chamber, the first conduit chamber being in pressure communication with the first conduit, and the first ambient chamber being in pressure communication with the ambient region.

2. The downhole fluid control apparatus according to claim 1, wherein a first pressure differential applied between the first and second conduits facilitates a first operation of the downhole device, and a second pressure differential applied between the first and second fluid conduits facilitates a second operation of the downhole device.

3. The downhole fluid control apparatus according to claim 1, wherein the valve is reconfigurable from its first configuration to its second configuration by elevating the pressure in both the first and second conduits above the ambient pressure.

4. The downhole fluid control apparatus according to claim 1, wherein the valve comprises a valve member moveable by the actuator between a first position in which the valve is configured in its first configuration, and a second position in which the valve is configured in its second configuration.

5. The downhole fluid control apparatus according to claim 4, wherein when the valve member is in its first position a fluid communication path is established between the first and second conduits, and when the valve member is in its second position the fluid communication path is sealed to prevent communication between the first and second conduits.

6. The downhole fluid control apparatus according to claim 4, wherein the housing defines a valve bore, and the valve member is moveable within the valve bore, and wherein the valve bore includes a first valve port in communication with the first conduit and a second valve port in communication with the second conduit, wherein the valve member is moveable within the valve bore to selectively permit and prevent communication between the first and second valve ports.

7. The downhole fluid control apparatus according to claim 6, wherein the housing defines an actuator bore which extends from the valve bore, wherein the actuator is moveable within the actuator bore, the valve bore and the actuator bore being separated by a sealing arrangement.

8. The downhole fluid control apparatus according to claim 7, wherein the actuator bore comprises one or more ambient ports to permit the actuator to be in communication with the ambient region.

9. The downhole fluid control apparatus according to claim 8, wherein the actuator bore comprises a first actuator port in communication with the first conduit and a second actuator port in communication with the second conduit.

10. The downhole fluid control apparatus according to claim 1, wherein the actuator is moveable in a first direction to cause the valve to be reconfigured from its first configuration to its second configuration, and the actuator is moveable in a second direction to cause the valve to be reconfigured from its second configuration to its first configuration.

11. The downhole fluid control apparatus according to claim 10, wherein at least one of:
pressure within the first and/or second conduit acts on the actuator to bias said actuator in the first direction;
ambient pressure resists movement of the actuator in the first direction; and
the actuator is biased in the second direction by a biasing arrangement.

12. The downhole fluid control apparatus according to claim 1, wherein the first piston head is coupled to the actuator rod such that movement of the first piston head causes movement of the actuator rod.

13. The downhole fluid control apparatus according to claim 12, wherein the first piston head is coupled to the actuator rod via a unidirectional connection which permits the first piston head to drive the actuator rod in a first direction, and prevents the first piston head from driving the actuator rod in a second direction.

14. The downhole fluid control apparatus according to claim 1, wherein the actuator piston assembly comprises a second piston head moveably mounted in a second piston bore section within the housing, the second piston bore section being isolated from the first piston bore section by a sealing arrangement.

15. The downhole fluid control apparatus according to claim 14, wherein the second piston head divides the second piston bore section into a second conduit chamber and a second ambient chamber, the second conduit chamber being in pressure communication with the second conduit, and the second ambient chamber being in pressure communication with the ambient region.

16. The downhole fluid control apparatus according to claim 14, wherein the second piston head is coupled to the actuator rod such that movement of the second piston head causes movement of the actuator rod.

17. The downhole fluid control apparatus according to claim 16, wherein the second piston head is coupled to the actuator rod via a unidirectional connection which permits the second piston head to drive the actuator rod in a first direction, and prevents the second piston head from driving the actuator rod in a second direction.

18. A method for downhole fluid control, comprising:
providing communication between a pressure source and a downhole device via first and second conduits;
providing an actuator in pressure communication with the first and second conduits and with an ambient region external of an apparatus, wherein the actuator operates a valve, and wherein the actuator comprises an actuator piston assembly operable by pressure provided via one or both of the first and second conduits,
the actuator piston assembly comprising an actuator rod moveable within a housing, wherein the actuator rod is engaged with the valve, and a first piston head moveably mounted in a first piston bore section within the housing, the first piston head dividing the first piston bore section into a first conduit chamber and a first ambient chamber, the first conduit chamber being in pressure communication with the first conduit, and the first ambient chamber being in pressure communication with the ambient region;

establishing a pressure within each of the first and second conduits which is lower than the ambient pressure such that the valve is configured in a first configuration in which the first and second fluid conduits are in pressure communication with each other; and establishing a pressure within at least one of the first and second conduits which exceeds the ambient pressure to cause the actuator to reconfigure the valve to a second configuration in which the first and second conduits are isolated from each other.

19. The method according to claim 18, comprising establishing a pressure within each of the first and second conduits which exceeds the ambient pressure to cause the actuator to reconfigure the valve to the second configuration in which the first and second conduits are isolated from each other.

20. The method according to claim 18, comprising establishing a pressure differential between the first and second conduits when the valve is configured in its second configuration to operate the downhole device.

21. The method according to claim 20, comprising, when the valve is in its second configuration, establishing a first pressure differential between the first and second conduits to facilitate a first operation of the downhole device, and establishing a second pressure differential between the first and second conduits to facilitate a second operation of the downhole device.

* * * * *